United States Patent [19]

Fiore et al.

[11] Patent Number: 4,805,117

[45] Date of Patent: Feb. 14, 1989

[54] METHOD FOR CONTROLLING CONCATENATION OF TRANSFORMATION MATRICES IN A GRAPHICS DISPLAY SYSTEM

[75] Inventors: Anthony M. Fiore, Kingston; Bruce C. Hempel, Tivoli; Gregory D. Laib; Bob C. Liang, both of West Hurley, all of N.Y.

[73] Assignee: International Business Machines Corporation, Armonk, N.Y.

[21] Appl. No.: 912,724

[22] Filed: Sep. 26, 1986

[51] Int. Cl.$^4$ ............................................. G06K 9/32
[52] U.S. Cl. .................................... 364/518; 340/720; 364/521; 382/46
[58] Field of Search .............................. 364/518–522; 382/44–46; 340/703, 720, 723

[56] References Cited

U.S. PATENT DOCUMENTS

| | | | |
|---|---|---|---|
| 4,457,015 | 6/1984 | Nally et al. | 382/45 |
| 4,635,212 | 1/1987 | Hatazawa | 382/44 X |
| 4,637,057 | 1/1987 | Kermisch | 382/46 |
| 4,658,430 | 4/1987 | Anderson et al. | 382/46 |
| 4,691,364 | 9/1987 | Fukazawa et al. | 382/44 X |
| 4,706,205 | 11/1987 | Akai et al. | 382/44 X |
| 4,709,231 | 11/1987 | Sakaibara et al. | 364/522 X |

OTHER PUBLICATIONS

IBM 5080 Principles of Operation, GA23-2012-0, pp. 1-1 through 1-16.
Fundamentals of Interactive Computer Graphics, Foley and Van Dam, 1982, pp. 245-266.

Primary Examiner—Gary V. Harkcom
Assistant Examiner—H. R. Herndon
Attorney, Agent, or Firm—Mark S. Walker; George E. Clark

[57] ABSTRACT

In graphics display systems the use of matrix concatenation for coordinate transformation, occasionally, will cause an overflow which may represent an out-of-bounds location of a data element. To correct the overflow problem, a number of translation shift factors are introduced for the last row of the matrix which when used to operate on matrix elements, will maintain the elements within the physical boundaries of the graphics base by preventing overflow. Additionally, a method of adjusting the clipping boundaries to increase the precision of coordinate transformations is also described. The methods of the invention may be implemented in microcode in a commercially availably graphics display system such as the IBM 5080 Graphics System.

18 Claims, 13 Drawing Sheets

FIG.4
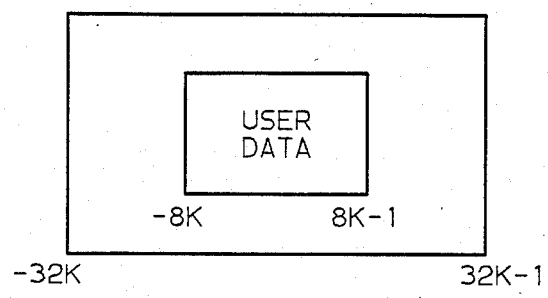
THE TRANSLATION SHIFT FACTORS ARE ALL 1'S
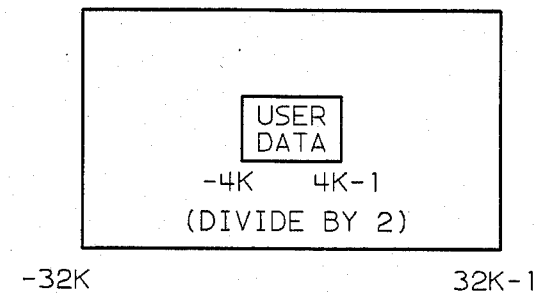
FIG.6
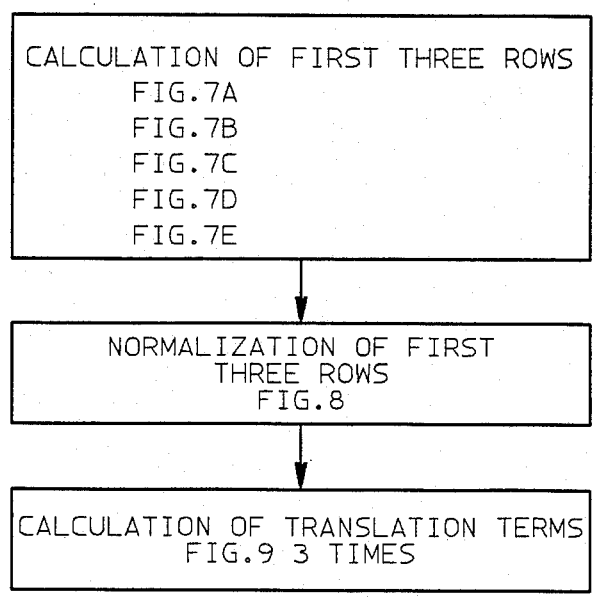

FIG. 5

CALCULATION OF M∗N

|   | M11 | M12 | M13 |                |
|---|-----|-----|-----|----------------|
| M | M21 | M22 | M23 | MATRIX ELEMENT |
|   | M31 | M32 | M33 |                |
|   | M41 | M42 | M43 |                |

SF1           SHIFT FACTOR
T1F1          TRANSLATION SHIFT FACTOR
T2F1
T3F1

|   | N11 | N12 | N13 |                |
|---|-----|-----|-----|----------------|
| N | N21 | N22 | N23 | MATRIX ELEMENT |
|   | N31 | N32 | N33 |                |
|   | N41 | N42 | N43 |                |

SF2           SHIFT FACTOR
T1F2          TRANSLATION SHIFT FACTOR
T2F2
T3F2

THE RESULTANT MATRIX Q=M∗N

|   | Q11 | Q12 | Q13 |                |
|---|-----|-----|-----|----------------|
| Q | Q21 | Q22 | Q23 | MATRIX ELEMENT |
|   | Q31 | Q32 | Q33 |                |
|   | Q41 | Q42 | Q43 |                |

SF3           SHIFT FACTOR
T1F3          TRANSLATION SHIFT FACTOR
T2F3
T3F3

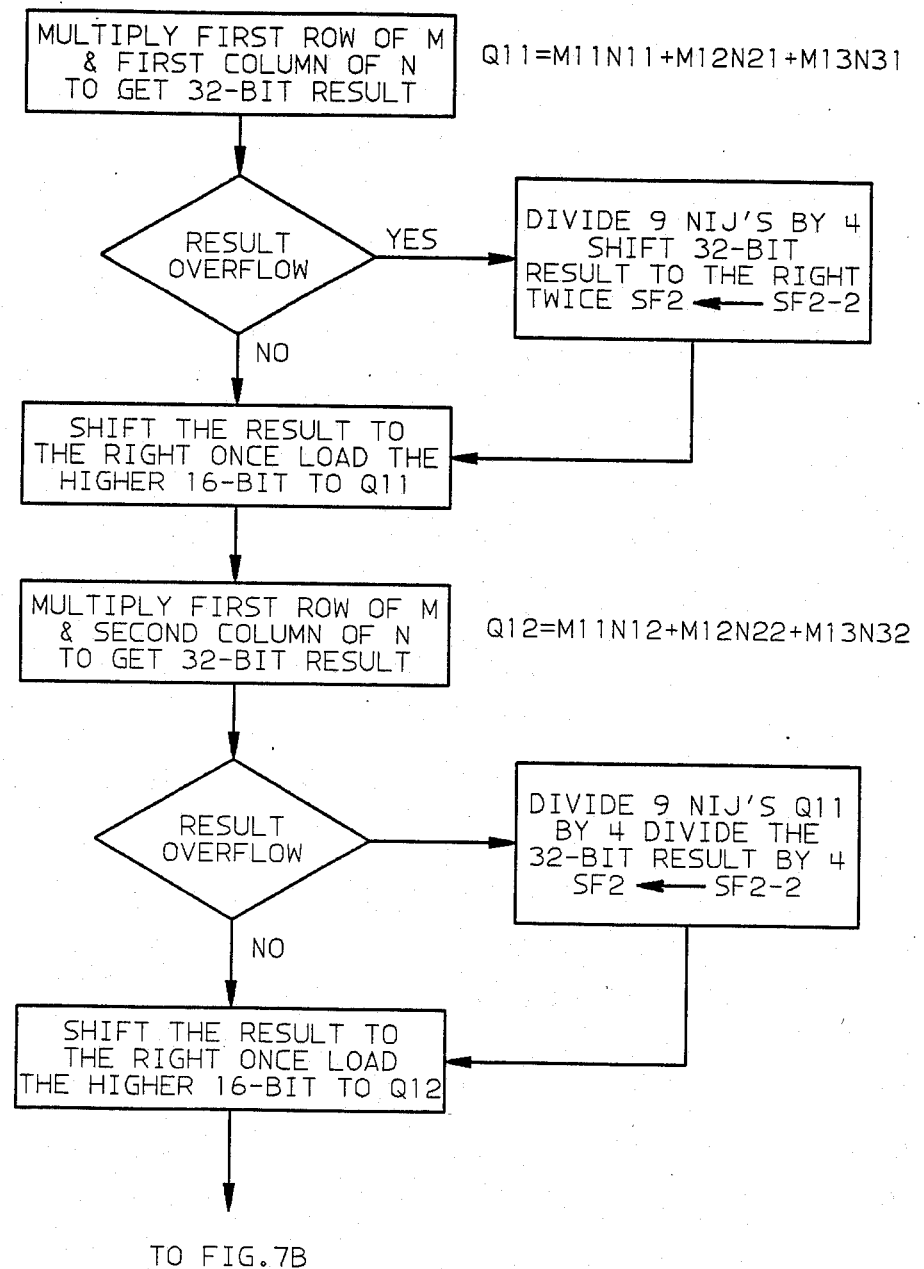

FIG. 7B

FROM FIG. 7A

↓

MULTIPLY FIRST ROW OF M
& THIRD COLUMN OF N
TO GET 32-BIT RESULT

Q13=M11N13+M12N23+M13N33

↓

RESULT OVERFLOW —YES→ DIVIDE 9 NIJ'S, Q11 Q12 BY 4 DIVIDE THE 32-BIT RESULT BY 4   SF2 ← SF2-2

NO ↓

SHIFT THE RESULT TO THE RIGHT ONCE LOAD THE HIGHER 16-BIT TO Q13

↓

MULTIPLY FIRST ROW OF M & FIRST COLUMN OF N TO GET 32-BIT RESULT

Q21=M21N11+M22N21+M23N31

↓

RESULT OVERFLOW → DIVIDE 9 NIJ'S, Q11 Q12, Q13 BY 4 DIVIDE THE 32-BIT RESULT BY 4  SF2 ← SF22

NO ↓

SHIFT THE RESULT TO THE RIGHT ONCE LOAD THE HIGHER 16-BIT TO Q21

FROM FIG.7B

```
MULTIPLY SECOND ROW OF M
AND SECOND COLUMN OF N      Q22=M21N12+M22N22+M23N32
  TO GET 32-BIT RESULT
```

```
                        YES    DIVIDE 9 NIJ'S,Q11
     RESULT                    Q12,Q13,Q21 BY 4
    OVERFLOW  ─────────────>   DIVIDE THE 32-BIT
                                  RESULT BY 4
        │NO                      SF2 ←── SF2-2
        ▼
  SHIFT THE RESULT TO
THE RIGHT ONCE LOAD THE  <─────
  HIGHER 16-BIT TO Q22
```

```
MULTIPLY SECOND ROW OF M
  & THIRD COLUMN OF N        Q23=M21N13+M22N23+M23N33
  TO GET 32-BIT RESULT
```

```
                        YES    DIVIDE 9 NIJ'S,Q11
     RESULT                    Q12,Q13, Q21,Q22
    OVERFLOW  ─────────────>   BY 4 DIVIDE THE
                               32-BIT RESULT BY 4
        │NO                      SF2 ←── SF2-2
        ▼
  SHIFT THE RESULT TO
   THE RIGHT ONCE LOAD   <─────
THE HIGHER 16-BIT TO Q23
```

TO FIG 7D

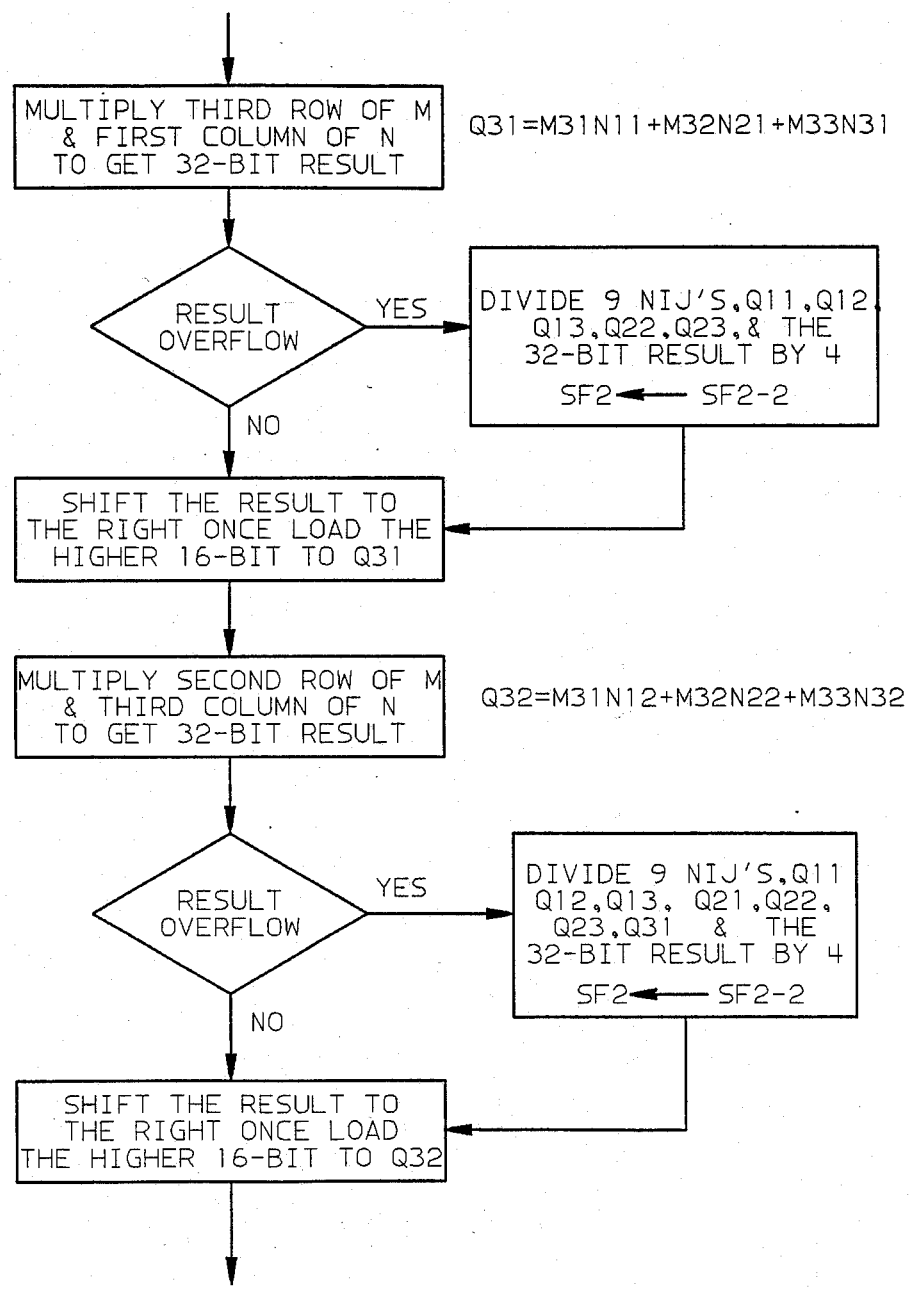

METHOD FOR CONTROLLING CONCATENATION OF TRANSFORMATION MATRICES IN A GRAPHICS DISPLAY SYSTEM

BACKGROUND OF THE INVENTION

The current invention relates to information handling systems, and more particular to methods for data transformation in a graphics display system.

PRIOR ART

The IBM 5080 Graphics Display System as described in IBM publication GA23-2012-0, IBM 5080 Model 2 Principles of Operation, performs concatenation on transformation matrices in which there is a single shift factor for a number of matrix shift elements, for example, 9 elements for a three-dimensional space. The prior art IBM 5080 transformation matrix calculation does not provide a translation shift factor as does the instant invention to control overflow conditions resulting from concatenation of a number of matrices.

SUMMARY OF THE INVENTION

It is an object of the present invention to efficiently transform graphics data in a graphics display system by a method comprising the steps of: forming a first matrix usually comprising twelve matrix elements, at least one scale shift factor and a number of translation shift factors, forming a second matrix having a similar structure to the first matrix and calculating results of matrix concatenation for the elements of the first and second matrices to form a third matrix, normalizing the third matrix by determining the number of leading zeros in each element, and calculating translation terms which make up a last row of the third matrix to complete the third matrix which comprises the translated graphics data, the resulting transformation matrix is then used to transform a graphics object through matrix multiplication.

Accordingly, a method for transforming graphics data in a graphics display system includes the steps: forming a first matrix usually comprising nine matrix elements, at least one scale shift factor and a number of translation shift factors, forming a second matrix having a similar structure to the first matrix and calculating results of matrix concatenation for the elements of each first and second matrixes to form a third matrix, normalizing the third matrix by determining the number of leading zeros in each element, and calculating translation terms which make up a last row of the third matrix to complete the third matrix which comprises the translated graphics data.

The foregoing and other objects, features and advantages of the present invention will be apparent from the following, more particular description of a preferred embodiment of the invention as illustrated in the accompanying drawings.

BRIEF DESCRIPTION OF THE DRAWINGS

FIG. 4 is a schematic diagram showing the results of matrix concatenation on graphics data in a large coordinate space.

FIG. 5 is a schematic diagram of the calculation of the concatenation of two matrices in accordance with the present invention.

FIG. 6 is a simplified flow chart of the method of matrix concatenation in accordance with the present invention.

FIG. 7, which includes FIGS. 7(a), 7(b), 7(c), 7(d), and 7(e), is a flow chart of the matrix multiplication in accordance with the present invention.

DETAILED DESCRIPTION OF THE PREFERRED EMBODIMENT

Figure 1:
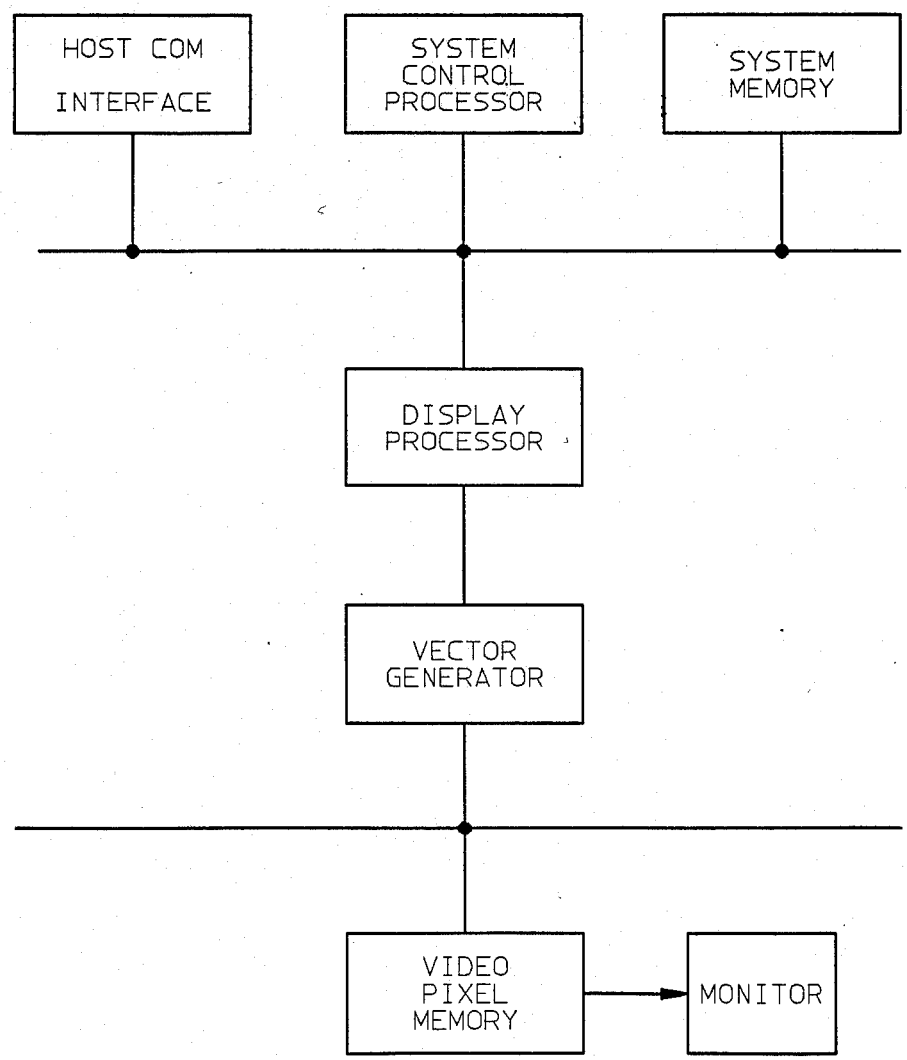
FIG. 1 is a block diagram of a raster graphics system which may perform the method of the present invention.

A Graphics Display System uses a special form of matrix for coordinate transformation (see the section below), which is a 4×3 matrix (4 rows and 3 columns). The first three rows are 9 fractional numbers sharing one shift factor, and the last row of 3 numbers are integers. The first set of numbers typically represent scaling, rotating or shearing factors to be applied to the coordinates of a point to be transformed. The second set of numbers typically represent translation values to translate the coordinates.

In some applications, as the result of the concatenation of several matrices, the result matrix element will overflow. This is due to the use of registers of fixed size, e.g. 16 bits, which may be unable to hold the result of an operation on two 16 bit numbers. To solve this precision problem, three independent shift factors are introduced below for the last row of the matrix. These three elements, together with the first three rows of the matrix, constitute a new matrix. (see the section on example below).

Based upon the shift factors of the result matrix, if any of the translation terms exceed 16-bit, then the clipping boundary can be adjusted, that is, the user data can be adjusted to avoid overflow. (see FIG. 4)

Matrix Format

Elements of a Matrix M are represented in the form $m_{ij}$-element of i-th row and j-th column.

Transformation Matrix

A Transformation Matrix may be of the following format:

(3D matrix is used here for discussion. A 2D matrix can be defined as a subset of a 3D matrix).

| M | | | | |
|---|---|---|---|---|
| | m11 | m12 | m13 | matrix element |
| | m21 | m22 | m23 | |
| | m31 | m32 | m33 | |
| | m41 | m42 | m43 | |
| | sf | | | shift factor |

The first nine elements
m11, m12, . . . , m33
are fractional numbers of the form
 s.xxx xxxx xxxx xxxx
The numbers m41, m42, m43 are numbers of the form sxxx xxxx xxxx xxxx The above numbers are represented internally in the 2's complement format.

The element sf is the shift factor and ranges from 0 to 12.

The last three terms m41, m42, and m43 are the translation terms.

Coordinate Transformation

The transformation matrix is used to transform a given point coordinate into a form for display on a graphics device such as a display monitor or laser printer. The transformation allows a coordinate expressed in world coordinate form to be scaled, rotated, or translated for display on the graphics device.

Given a point (x,y,z) in interger format, the result of the matrix multiplication by M is $$newx = (x*m11 + y*m21 + z*m-)*(2**sf) + m41$$

$$newy = (x*m12 + y*m22 + z*m32)*(2**sf) + m42$$

$$newz = (x*m13 + y*m32 + z*m\times)*(2**sf) + m43$$

Matrix Concatenation

Rather than perform matrix multiplication for each transformation matrix applicable to a point, the matrices are concatenated so only one matrix multiplication is required for each point.

Given two Matrices M, N:

| M | m11 | m12 | m13 | Matrix Element |
|---|---|---|---|---|
|   | m21 | m22 | m23 |   |
|   | m31 | m32 | m33 |   |
|   | m41 | m42 | m43 |   |
|   | sf1 |   |   | Shift Factor |
| N | n11 | n12 | n13 | Matrix Element |
|   | n21 | n22 | n23 |   |
|   | n31 | n32 | n33 |   |
|   | n41 | n42 | n43 |   |
|   | sf2 |   |   | Shift Factor |

The resultant matrix Q=M*N

| Q | q11 | q12 | q13 | Matrix Element |
|---|---|---|---|---|
|   | q21 | q22 | q23 |   |
|   | q31 | q32 | q33 |   |
|   | q41 | q42 | q43 |   |
|   | sf3 |   |   | Shift Factor | is given by $$q11 = m11*n11 + m12*n21 + m13*n31$$

$$q12 = m11*n12 + m12*n22 + m13*n32$$

$$q13 = M11*n13 + m12*n23 + m13*n33$$

$$q21 = m21*n11 + m22*n21 + m23*n31$$

$$q22 = m21*n12 + m22*n22 + m23*n32$$

$$q23 = m21*n13 + m22*n23 + m23*n33$$

$$q31 = m31*n11 + m32*n21 + m33*n31$$

$$q32 = m31*n12 + m32*n22 + m33*n32$$

$$q33 = m31*n13 + m32*n23 + m33*n33$$

$$sf3 = sf1 + sf2$$

$$q41 = (m41*n11 + m42*n21 + m43*n31)(2**sf2) + n41$$

$$q42 = (m41*n12 + m42*n22 + m43*n32)(2**sf2) + n42$$

$$q43 = (m41*n13 + m42*n23 + m43*n33)(2**sf2) + n43$$

Note: The shift factor sf3 must be adjusted if the number of leading zeros of all the nine terms are greater than zero.

Matrix concatenation can lead to an overflow or underflow condition when implemented using registers of fixed size, e.g. 16 bits. The results of an operation on two 16 bit numbers, e.g. m41*n11, may exceed the capacity of the 16 bit register. Precision is frequently lost when one number is very large and the other is very small. To solve this problem a new transformation matrix concatenation procedure has been developed.

PHIGS Matrix

The PHIGS Matrix, is on the following format:

(3D matrix is used here for discussion. A 2D matrix can be defined as a subset of a 3D matrix)

| M | m11 | m12 | m13 | Matrix Element |
|---|---|---|---|---|
|   | m21 | m22 | m23 |   |
|   | m31 | m32 | m33 |   |
|   | m41 | m42 | m43 |   |
|   | sf  |     |     | Shift Factor |
|   | t1f |     |     | Translation Shift Factor |
|   | t2f |     |     | Translation Shift Factor |
|   | t3f |     |     | Translation Shift Factor |

The first nine elements m11, m12, . . . , m33 are fractional numbers of the form s.xxx xxxx xxxx xxxx

The numbers m41, m42, m43 are numbers of the form sxxx xxxx xxxx xxxx

The number sf is the shift factor.

The range of sf is from −16 to 16.

To simplify implementation, the shift factor = −512 (X'FE00') is used to indicate the Identity Matrix.

The numbers t1f, t2f, t3f are the shift factors for the three matrix elements m41, m42, m43.

That is, the translation terms are m41*(2**t1f)

m42*(2**t2f)

m43*(2**t3f)

The range of t1f, t2f, t3f are from −16 to 16.

Coordinate Transformation

Given a point (x,y,z) in integer format, the result of the matrix multiplication by M is $$newx = (x*m11 + y*m21 + z*m31)*(2**sf) + m41*(2**t1f)$$

$$newy = (x*m12 + y*m22 + z*m32)*(2**sf) + m42*(2**t2f)$$

$$newz = (x*m13 + y*m23 + z*m33)*(2**sf) + m43*(2**t3f)$$

Matrix Concatenation

Given two PHIGS Matrices M, N:

| M | m11 m12 m13 | Matrix Element |
|---|---|---|
|   | m21 m22 m23 |   |
|   | m31 m32 m33 |   |
|   | m41 m42 m43 |   |
|   | s1f | Shift Factor |
|   | t1f1 | Translation Shift Factor |
|   | t2f1 |   |
|   | t3f1 |   |
| N | n11 n12 n13 | Matrix Element |
|   | n21 n22 n23 |   |
|   | n31 n32 n33 |   |
|   | n41 n42 n43 |   |
|   | sf2 | Shift Factor |
|   | t1f2 | Translation Shift Factor |
|   | t2f2 |   |
|   | t3f2 |   |

The resultant matrix Q=M*N

| Q | q11 q12 q13 | Matrix Element |
|---|---|---|
|   | q21 q22 q23 |   |
|   | q31 q32 q33 |   |
|   | q41 q42 q43 |   |
|   | sf3 | Shift Factor |
|   | t1f3 | Translation Shift Factor |
|   | t2f3 |   |
|   | t3f3 |   | is given by $q11 = m11*n11 + m12*n21 + m13*n31$ $q12 = m11*n12 + m12*n22 + m13*n32$ $q13 = m11*n13 + m12*n23 + m13*n33$ $q21 = m21*n11 + m22*n21 + m23*n31$ $q22 = m21*n12 + m22*n22 + 23n32$ $q23 = m21*n13 + m22*n23 + m23*n33$ $q31 = m31*n11 + m32*n21 + m33*n31$ $q32 = m31*n12 + m32*n22 + m33*n32$ $q33 = m31*n13 + m32*n23 + m33*n33$ $sf3 = sf1 + sf2$
(See note 1)

Note 1. The shift factor sf3 must be adjusted if the number of leading zeros of all the nine terms are greater than zero.

The above calculation is the same as that done for the matrix.

The other three terms of the matrix elements

```
q41*(2**t1f3) = m41*n11*(2**t1f1)*(2**sf2) +
                m42*n21*(2**t2f1)*(2**(sf2) +
                m43*n31*(2**t3f1)*(2**(sf2) +
                n41*(2**t1f2)
q42*(2**t2f3) = m41*n12*(2**t1f1)*(2**sf2) +
                m42*n22*(2**t2f1)*(2**sf2) +
                m43*n32*(2**t3f1)*(2**sf2) +
                n42*(2**t2f2)
q43*(2**t3f3) = m41*n13*(2**t1f1)*(2**sf2) +
                m42*n23*(2**t2f1)*(2**sf2) +
                m43*n33*(2**t3f1)*(2**sf2) +
                n43*(2**t3f2)
```

The translation shift factors
t1f3, t2f3, t3f3        (see Note 2)
are calculated in the next section.

Note 2. The translation shift factors must be calculated from the three 32-bit interim numbers q41, q42, q43; by using the leading zeros or ones counts. (see the section on Calculating Matrix Elements)

COMPARISON WITH A PRIOR ART MATRIX

The difference between this matrix and a prior art matrix such as the IBM 5080 matrix can be summarized in the following:

| Prior Art | | | | Matrix of the Instant Invention | | |
|---|---|---|---|---|---|---|
| m11 m12 m13 | | | Matrix Element | m11 m12 m13 | | |
| m21 m22 m23 | | | | m21 m22 m23 | | |
| m31 m32 m33 | | | | m31 m32 m33 | | |
| m41 m42 m43 | | | | m41 m42 m43 | | |
| sf | | | Shift Factor | sf | | |
| (0=<sf=<12) | | | | (−16=<sf=< 16) | | |
| | | | Translation Shift Factor | t1f, t2f, t3f | | |
| | | | | (−16 =<t1f,t2f,t3f =< 16) | | |

The new matrix expands the range of the shift factor and introduces a new structure including translation shift factors.

An Example

The integer is 16-bit 2's complement format; ranging from −32768 to 32767.

Considering the following concatenation of 2 matrices:

Matrix M is the conceptual matrix for translating the x and y coordinates each by −24000.

| M = | 1 | 0 | 0 |
|---|---|---|---|
|   | 0 | 1 | 0 |
|   | 0 | 0 | 1 |
|   | −24000 | −24000 | 0 |

Matrix M and N, as represented using the inventive process of the current application, using the shift factors: (Matrix N rotates x and y by 45 degrees).

| M = | X'4000' | 0 | 0 | sf = 1 |
|---|---|---|---|---|
|   | 0 | X'4000' | 0 |   |
|   | 0 | 0 | X'4000' | (in Hex) |
|   | X'A240' | X'A240' | 0 |   |
| N = | cos45 | sin45 | 0 | sf = 0 |
|   | −sin45 | cos45 | 0 |   |
|   | 0 | 0 | X'4000' |   |
|   | 0 | 0 | 0 |   |

Prior Art

Using cos 45=sin 45=0.7071, the product of the two matrices is shown below.

Because of the 16-bit format, the number will become

| cos 45 | sin45 | 0 | sf = 0 |
|---|---|---|---|
| −sin45 | cos45 | 0 |   |
| 0 | 0 | X'4000' | (in Hex) |
| 0 | X'7B6C' | 0 |   | which is
(M*N computed incorrectly)

| cos45 | sin45 | 0 |
|---|---|---|
| −sin45 | cos45 | 0 |
| 0 | 0 | 0.5 |

-continued

| 0 | 31596 | 0 |

If one has more than 16-bit precision, the correct M*N should be:

| cos45 | sin45 | 0 |
| −sin45 | cos45 | 0 |
| 0 | 0 | 0.5 |
| 0 | −33940 | 0 |

The Method in This Document

Applying the procedure in document to the above two matrices M and N

The matrix

| M = | 1 | 0 | 0 |
| | 0 | 1 | 0 |
| | 0 | 0 | 1 |
| | −24000 | −24000 | 0 | will have the new format

| M = | X'4000' | 0 | 0 | sf = 1 |
| | 0 | X'4000' | 0 | |
| | 0 | 0 | X'4000' | (in Hex) |
| | X'A240' | X'A240' | 0 | |
| | t1f = 0 | t2f = 0 | t3f = 0 | |

The matrix

| N = | cos45 | sin45 | 0 | sf = 0 |
| | −sin45 | cos45 | 0 | |
| | 0 | 0 | X'4000' | |
| | 0 | 0 | 0 | | will have the new format

| N = | cos45 | sin45 | 0 | sf = 0 |
| | −sin45 | cos45 | 0 | |
| | 0 | 0 | X'4000' | |
| | 0 | 0 | 0 | |
| | t1f = 0 | t2f = 0 | t3f = 0 | |

The procedure in this document will yield the product M*N

| cos45 | sin45 | 0 | sf = 0 |
| −sin45 | cos45 | 0 | |
| 0 | 0 | X'4000' | |
| 0 | X'BDB6' | 0 | |
| t1f = 0 | t2f = 1 | t3f = 0 | |

Which represents the correct result

| cos45 | sin45 | 0 |
| −sin45 | cos45 | 0 |
| 0 | 0 | 0.5 |
| 0 | −33940 | 0 |

Adjusting the Number Ranges of Graphics Data

In case the terms of the result matrix of the concatenation would cause overflow, because the shift factors are too large, then the system will adjust the number range of the graphics data:

In the above example, the system could automatically divide the graphics data by 2, thus avoiding the overflow in the processing. (see FIG. 4).

Implementation

The IBM 5080 is used here to illustrate an implementation. (see IBM Graphics System 5080 Mod2 Principles of Operation GA23-2012-0).

A Raster Graphics System

Consider the raster graphics system in FIG. 1
It consists of the following major components.
1. System Control Processor
2. Host Communication Interface Processor
3. Display Processor
4. Hardware Rasterizer-Vector Generator
5. Video Pixel Memory
6. System Memory

Functions of Major Components

Here is a brief overview of the functions of the major components.
1. System Control Processor
   * The system Control Processor is a general purpose processor that has master control of the System. the System Control Processor is responsible for servicing all attached Graphics I/O devices (except the light pen and Display Monitor).
   * Coordinating the associated processing with the Display Processor.
   * The System Control Processor interfaces with the host via Host Communication Interface.
2. Host Communication Interface
   The Host Communication Interface provides the serial interface of the System to the host.
3. Display Processor
   The DP is responsible for executing the graphics orders in the Display Storage Program, residing in the system memory and is concerned mainly with the generation of the image that will appear on the Display Monitor. It has the following functions:
   * Decoding graphics orders and executing non-drawing order; e.g. book keeping and control.
   * Performs the transformation and clipping function to the geometric primitives: lines, characters, polygons, etc.
   * Preparing the following geometric objects for display: lines, characters, markers, filled polygons, by preprocessing and feeding the data to the Vector generator and Video Pixel Memory
4. Vector Generator
   Vector generator is a Hardware Implementation of the Bresenham Line Generating Algorithm, which takes the end points of a vector (line) as input, and generates pixels in the Video Pixel Memory as output for display.
5. Video Pixel Memory
   Video Pixel Memory consists of 8 1k by 1k bit planes, which supports 256 colors simultaneously via color look-up tables. The image stored here will be displayed in the Monitor.

The Logical Data Flow

Figure 3:
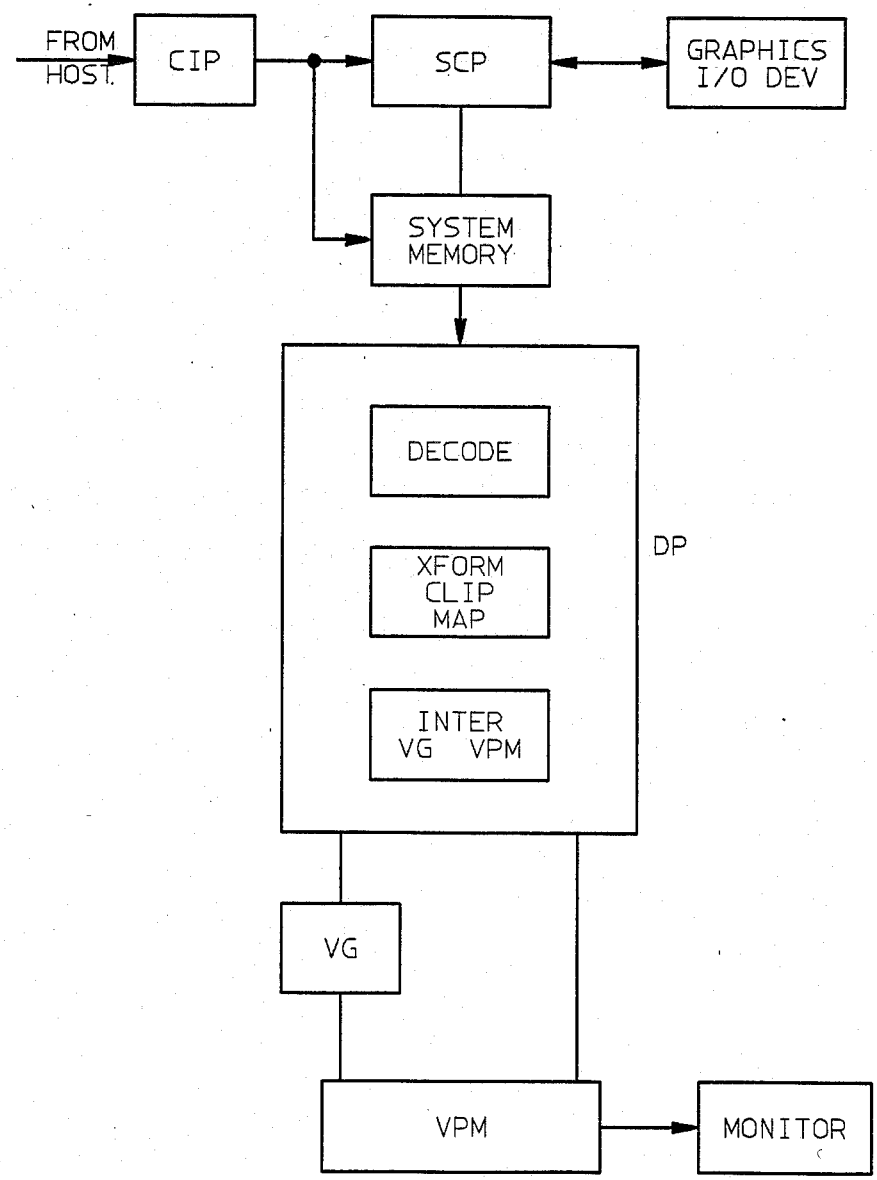
FIG. 3 is a logical data flow diagram for the display system shown in FIGS. 1 and 2.
Figure 7E:
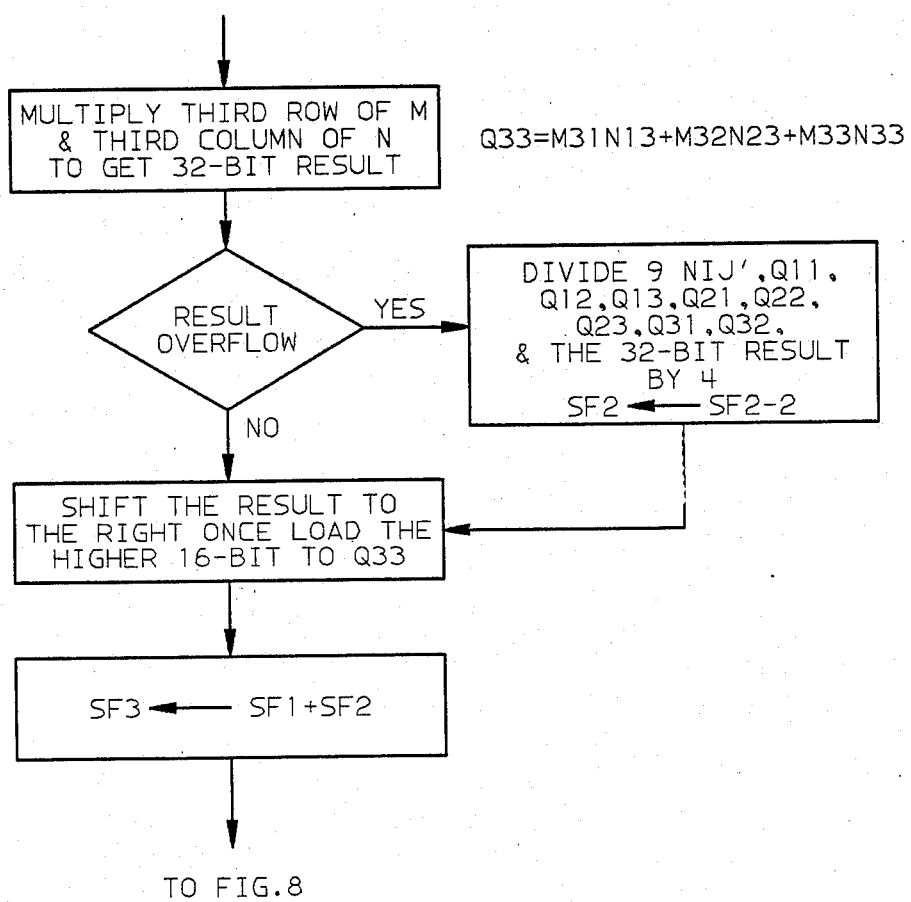
Figure 8:
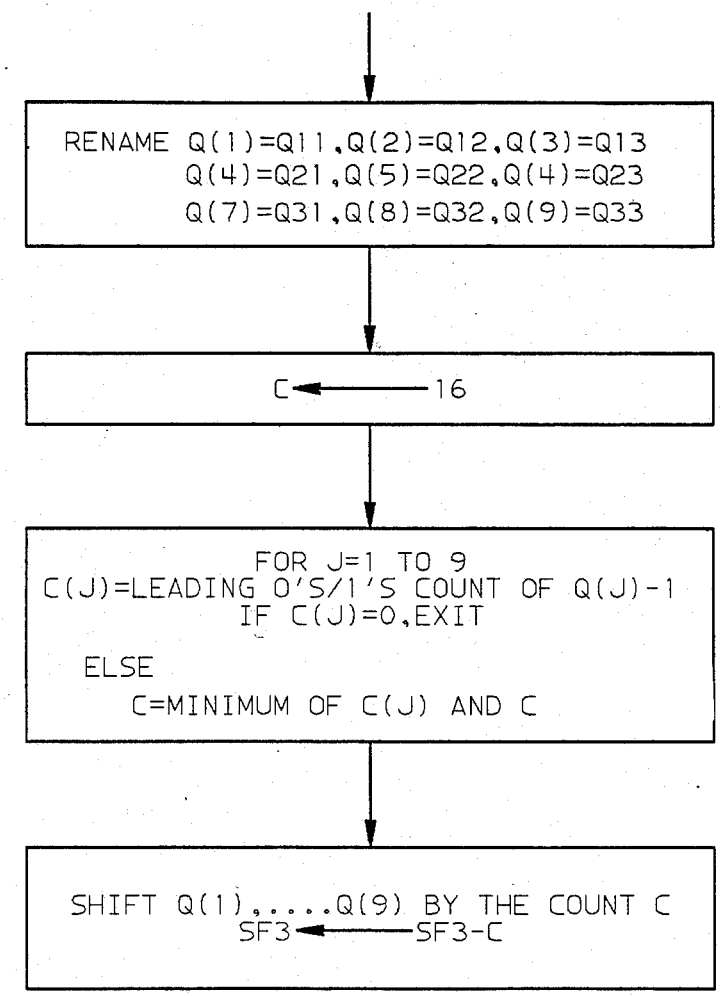
FIG. 8 is a flow chart of normalization of matrix elements in the resulting third matrix.
Figure 9:
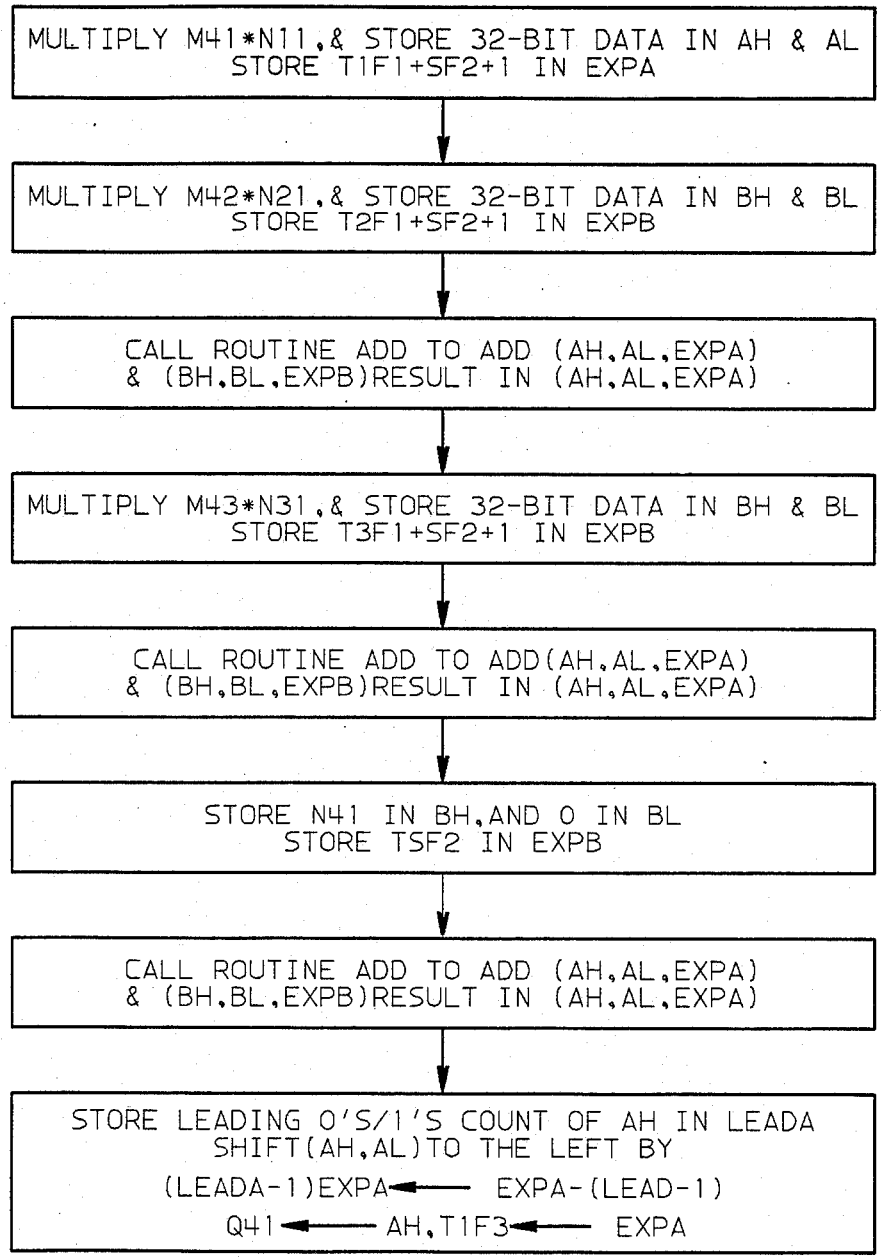
FIG. 9 is a flow chart showing calculation of translation terms for the resulting matrix.
Figure 10:
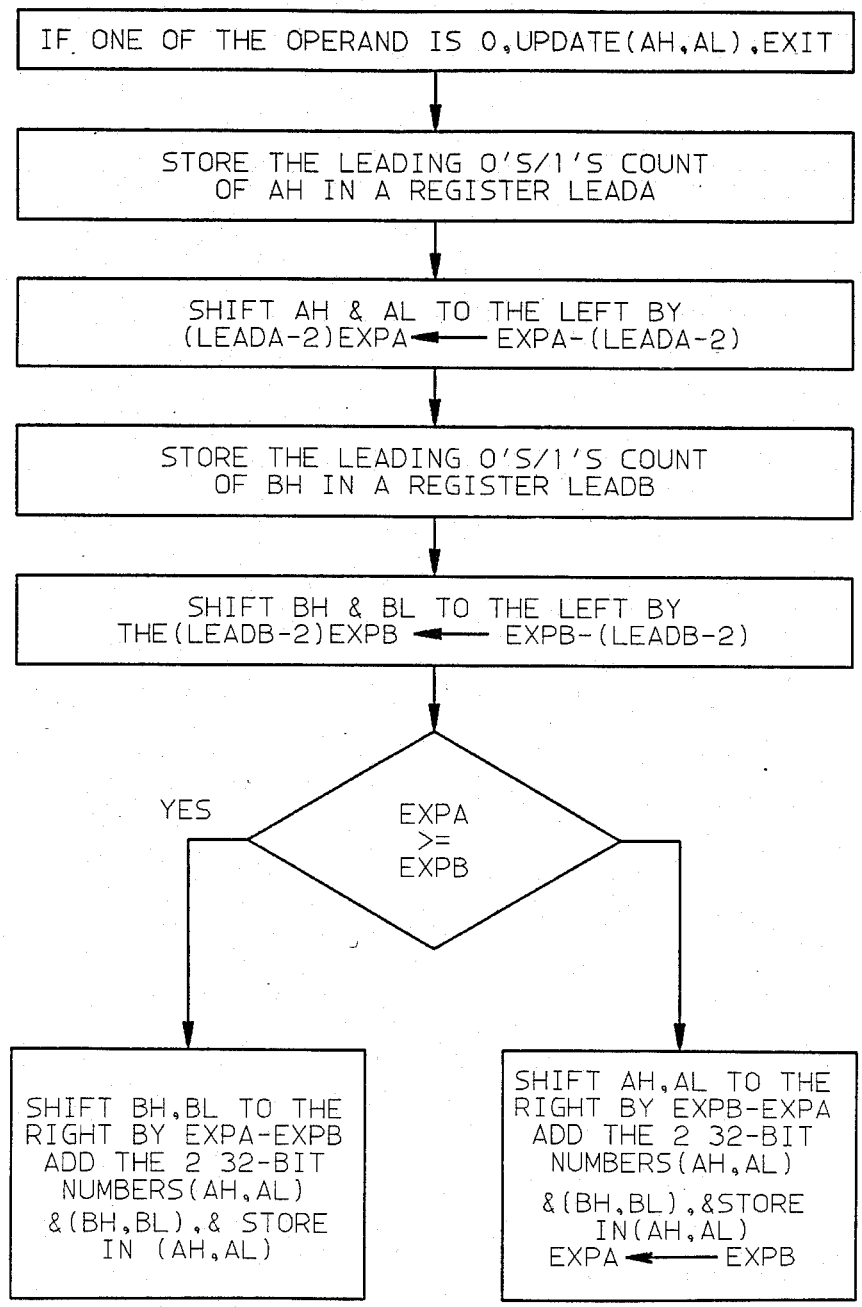
FIG. 10 is a block diagram of an add subroutine employed with the calculation flow shown in FIG. 9.

For the logical data flow of the graphics system, see FIG. 3.

1. The Application Program is loaded from the host via the Host communication Interface to the System Memory;
2. The System Control Processor preprocesses the data (depending on the work required), then interrupts the DP;
3. The Display Processor then processes the data;
4. The data is then passed to the VPM for display directly or via the Vector generator.

Transformation and Clipping

Transformation and Clipping are controlled by the contents of Attribute Register 19, which consist of 5 bits 00MP TDC0

For the bit definition and the control flow, see FIG. 4. The non-zero bits define: M-whether or not mapping is to be performed; P-Parallel or perspective clipping; T-whether or not transformation is performed; D-indicating 2 or 3 dimensional calculation; C-whether or not clipping is to be performed.

In the following, a vector (line) will be used as an example:

There are three stages in preparing a line for display on a display device:
1. Transformation
    For the end points of a vector, which is in the 16-bit fixed number format, the matrix multiplication is done in the (−32k, 32k-1), 16-bit x, y, and z space.
2. Clipping
    Using the two end points of a vector (line) and clip to the clipping box specified by the users.
    The computation is done is 16-bit space.
3. Mapping
    Mapping the contents inside the clipping box (in 3D) or clipping window (in 2D) to a viewport in the screen specified by the user.
    The screen coordinate is (0,4k-1) by (0,4k-1), which then mapped to the 1k by 1k screen.

Display Processor

The Display Processor is a microprogrammed system. It fetches the data from the memory and sends the data out to the raster display via the Vector Generator, which is a rasterizer. It takes the line segment end points coordinates as input, and generates pixels in the video pixel memory.

The main ingredients of the system (see FIG. 2) are:
1. Sequencer, e.g. AMD2910A;
2. 72-bit wide writable control store;
3. 16-bit ALU, e.g. 4 bit-slice AMD2903;
4. a 16×16 multiplier with 32-bit accumulator, e.g. WTL2010;
5. the barrel shifter is a custom-made chip, which does arithmetic multi-bit shifts for 32-bit data in one cycle. It also detects the leading 0's/1's count—the number of consecutive leading bits which are equal in the high 16-bit data register.
6. a clipper (for checking rival accept/reject);
7. 4k×16 scratch ram;
8. Logic for microcode next address coming from the content of scratchpad ram registers-indexed addressing.

The microprogram is stored in the writable control store.

Calculating Matrix Elements

This section covers the calculation of the translation terms and their shift factors by using the multiplier/accumulator, barrel shifter, and leading 0's/1's counter in the Display Processor. (see FIG. 3).

Calculating the Three New Matrix Elements in Matrix Concatenation

Figure 2:
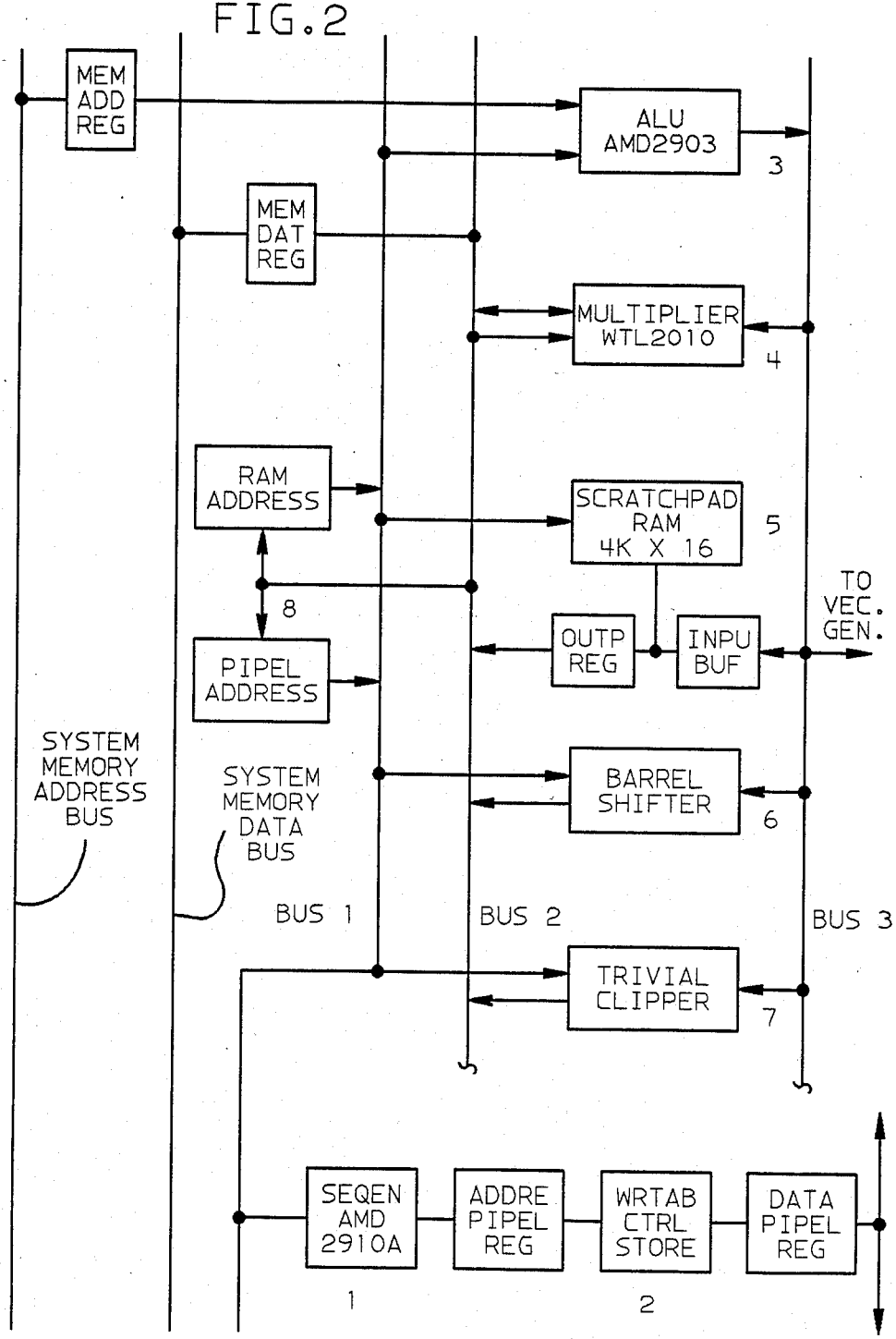
FIG. 2 is a block diagram of a display processor of the system of FIG. 1 for performing the method of the present invention.

The item numbers in the following subroutines are referred to the operational components of FIG. 2.
Here we cover the calculation of:

$$q41 = m41*n11*(2^{**}t1/1)*(2^{**}sf2)+$$

$$m42*n21*(2^{**}t2/1)*(2^{**}sf2)+$$

$$m43*n31*(2^{**}t3/1)*(2^{**}sf2)+$$

$$n41*(2^{**}t1/2)$$

The terms q42 and 143 can be handled in the same way.

Subroutine to compute the translation number:
1. Use the Multiplier/Accumulator (item #4) to calculate the 32-bit number
    m41*n11
    and store it in two 16 bit registers aH, aL; (item #3)
2. Store the number t1f1+sf2+1 in a register expa; (item #3)
    (see note 1)
3. Use the Multiplier/Accumulator (item #4) to calculate the 32-bit number
    m42*n21
    and store it in two 16 bit registers bH, bL, (item #3)
4. Store the number t2f1+sf2+1 in a register expb; (item #3)
    (see note 1)
5. Call subroutine ADD;
6. Use the Multiplier/Accumulator (item #4) to calculate the 32-bit number
    m43*n31
    and store it in two registers bH, bL; (item #3)
7. Store the number t3f1+sf2+1 in a register expb; (item #3)
    (see note 1)
8. Call subroutine ADD;
9. Store n41 in a register bH; (item #3) and
10. Store 0 in bL; (item #3)
11. Store the number tsf2 in a register expb; (item #3)
12. Call subroutine ADD;
13. Store the leading 0's/1's count (item #6) of aH in a register leada; (item #3)
14. Shift aH and aL to the left by leada - 1); (item #6)
15. expa ← expa - (leada - 1); (item #3)
    (the count leada - 1 is either 1 or 0)
16. q41 ← aH; (items #5,#3)
17. t1f3 ← expa. (items #5,#3)

Subroutine ADD

Subroutine to Add two numbers represented by 32-bit mantissa and 16-bit exponent.
(aH aL)*(2**expa)+(bH bL)*(2**expb)

Subroutine ADD

1. Store the leading 0's/1's count (item #6) of aH in a register leada; (item #3)
2. Shift aH and aL to the left by (leada - 2); (item #6)

3. expa ← expa - (leada - 2); (item 33)
4. Store the leading 0's/1's count (item #6) of bH in a register leadb; (item #)
5. Shift bH and bL to the left by the (leadb - 2); (item #6)
6. expb ← expb - (leadb - 2); (item #3)
(see Note 2)
7. Check whether expa > =expb? (item #3)
8. If expa > =expb
   a. Shift bH, bL to the right by expa - expb to make the numbers have the same exponent; (item 36)
   b. Add the two 32-bit numbers aH, aL and bH, bL together; (item #3)
   c. Store the result in aH and aL. (item #3)
9. Else (expa < expb)
   Shift aH, aL to the right by expb - expa to make the numbers have the same exponent; (item #6)
   b. Add the two 32-bit numbers aH, aL and bH, bL together; (item #3)
   c. Store the result in aH and aL. (item #3)
   d. expa ← expb (item #3)
(End of Subroutine Add)
Format of the matrix element of last row
After the calculation, q41 is contained in three registers

|  aH | aL |
|---|---|
| (sxxx xxxx xxxx xxxx) | (.xxxx xxxx xxxx xxxx) |
| (see note 1) | | and the exponent in expa.
q41 is given by (aH aL)*(2**expa).
Note
Note 1. The output of the multiplier/accumulator is of the format
s xxx xxxx xxxx xxxx x.xxx xxxx xxxx xxxx
to adjust to the format
s xxx xxxx xxxx xxxx .xxxx xxxx xxxx xxxx
the exponent of the first number is greater than that of the second number by 1. The exponent is therefore incremented by 1.
Note 2. (count-2) is used to avoid possible overflow in the addition when expa=expb.

Mapping to 5080 Matrix Format

In order to use the 5080 transformation capability, the new Matrix must be mapped to the 5080 matrix format. For a Matrix M

| M | m11 | m12 | m13 | Matrix element |
|---|---|---|---|---|
|   | m21 | m22 | m23 |   |
|   | m31 | m32 | m33 |   |
|   | m41 | m42 | m43 |   |
|   | sf  |     |     | Shift factor |
|   | t1f |     |     |   |
|   | t2f |     |     |   |
|   | t3f |     |     |   |

A new variable tsf is defined as $$tsf = \max(t1f, t2f, t3f)$$

When a PHIGS matrix is mapped to the 5080 to the 5080 matrix element format, both the transformation matrix and the clipping boundaries are changed to prevent possible data overflow caused by the concatenation of matrices. Adjusting the clipping boundaries reduces the zoom of the image. Changing the transformation matrix results in smaller value coordinates with greater precision. This method provide increased precision when a fixed size register (e.g. 16 bits) is used.

We first adjust the shift factors, translation terms of the matrix and the clipping boundaries. The adjustment is based on the values of the shift factors sf and tsf. The decision table is listed below:

|   | new shift factor sf | m41, m42, m43 | clipping boundaries/ |
|---|---|---|---|
| sf = 21 3<br>tsf = < 0 | sf | m41 <— m41*(2**t1f)<br>m42 <— m42*(2**t2f)<br>m43 <— m43*(2**t3f) | no change |
| sf = < 3<br>tsf > 0 | sf−tsf | m41 <— m41*(2**(t1f−tsf))<br>m42 <— m42*(2**(t2f−tsf))<br>m43 <— m43*(2**(t3f−tsf)) | multiplied by 2**(−tsf) |
| sf > 3<br>sf−tsf > 3 | 3 | m41 <— m41*(2**(4−sf+t1f))<br>m42 <— m42*(2**(4−sf+t2f))<br>m43 <— m43*(2**(4−sf+t3f)) | multiplied by s**(4−sf) |
| sf > 3<br>sf−tsf = <3 | sf−tsf | m41 <— m41*(2**(t1f−tsf))<br>m42 <— m42*(2**(t2f−tsf))<br>m43 <— m43*(2**(t3f−tsf)) | multiplied by 2**(−tsf) |

After the adjustment, if the new shift factor sf is negative, then each of the first nine terms m11, m12, m13, m21, m22, m23, m31, m32, m33 is multiplied by 2**sf, and sf is set to zero.

PHIGS Matrix Manipulation

There are two applications of the new PHIGS Matrix:
1. As a utility function used by the application program;
2. As a utility function used in computing the PHIGS transformation environment.

Utility Function

There are 256 graphics program registers defined for the 5080 display program. Each register is of 16-bits, and denoted by GRn, where n is an integer from 0 to 255.

There is a 5080 graphics order for matrix concatenation of the following format:
opcode
a-address
b-address
c-address
which concatenate two matrices A and B-A*B, and the result is in matrix C.

All these matrices are located in the graphics program registers.

a-address is the beginning address (register address) of the first matrix element of A.

b-address is the beginning address (register address) of the first matrix element of B.

c-address is the beginning address (register address) of the first matrix element of C.

| a11 | ← a-address GRa |
|---|---|
| a12 | GR(a+1) |
| a13 | |
| a21 | |
| a22 | |
| a23 | |
| a31 | |
| a32 | |
| a33 | |
| a41 | |
| a42 | |
| a43 | |
| asf | |
| atf1 | |

-continued

| | |
|---|---|
| atf2 | |
| atf3 | GR(a+15) |
| b11 | ← b-address GRb |
| b12 | GR(b+1) |
| b13 | |
| b21 | |
| b22 | |
| b23 | |
| b31 | |
| b32 | |
| b33 | |
| b41 | |
| b42 | |
| b43 | |
| bsf | |
| btf1 | |
| btf2 | |
| btf3 | GR(b+15) |
| c11 | ← c-address GRc |
| c12 | GR(c+1) |
| c13 | |
| c21 | |
| c22 | |
| c23 | |
| c31 | |
| c32 | |
| c33 | |
| c41 | |
| c42 | |
| c43 | |
| csf | |
| ctf1 | |
| ctf2 | |
| ctf3 | GR(c+15) |

Computing the PHIGS Transformation Environment

Associated with each drawing primitive are the following matrices in the PHIGS/5080 interface:
1. View Matrix
2. Global Matrix
3. Local Matrix
4. Normalization Matrix Each of the first three matrices consists of 16 elements.

The fourth one consists of 7 elements-shift factor, 3 translation terms, and three translation shift factors. This is expanded to a matrix in the 16 element format before it is used in the computation. that is, the input data string
  sf, m41, m42, m43, tf1, tf2, tf3
will result in the following matrix
  x'4000', 0, 0, 0, x'4000', 0, 0, 0, x'4000', m41, m42, m43, sf+1, tf2, tf3.

Order of Concatenation

The order of concatenation of the above 4 matrices is (Normal) (Local) (Global) (View)
The result is saved in 16 registers called
  TraMatrix
Furthermore, Global and View Matrices do not change very often. Therefore, the concatenation of (Global)(View)
is saved in 16 registers called
  TemMatrix Two bits defined in the control registers- Tra-bit (to indicate a change has occurred in TraMatrix), and Tem-bit (to indicate a change has occurred in TemMatrix) are used to improve the performance in the traversal time. Performance is enhanced when the concatenation to form the TemMatrix or TraMatrix is not required before each transformation when no transformation data has changed.

TraMatrix is the matrix mapped to the 5080 matrix format.

Data Flow for PHIGs Matrices Manipulation

For each PHIGS drawing primitive-polylines, polymarkers, annotation text, etc; the matrix must be (re-) computed before the processing of the draw data. The TraMatrix is used to transform each point of the graphic image so that it is generated at the appropriate position on the display monitor.

The data flow of the matrix manipulation is as follows:
1. If Tra-bit is off, then exit (the current matrix is not changed);
2. If Tra-bit is on, then check the Tem-bit; and reset Tra-bit;
   a. If Tem-bit is off, then skip this step;
   b. If Tem-bit is on, then multiply the two matrices Global and View, and put the result in TemMatrix; and reset Tem-bit;
3. Multiply the three matrices
   Normal, Local, and TemMatrix and put the result in TraMatrix;
4. Map TraMatrix to the 5080 matrix format, adjusting the clipping boundaries and viewpoint if necessary.

While the invention has been particularly shown and described with reference to a preferred embodiment thereof, it will be understood by those skilled in the art that various changes in form and detail may be made therein without departing from the spirit and the scope of the invention.

What is claimed is:

1. A method of transforming a graphics object in a graphics processing system comprising the steps of:
   forming at least two matrices for transformation each matrix containing a first set of elements and a second set of elements;
   defining a register to contain a shift factor for said first set of elements;
   defining a plurality of registers each of which contains a translation shift factor for one of said second set of elements;
   forming a product matrix by concatenating two of said at least two matrices, said concatenation comprising the steps of:
     calculating a first set of elements for said product matrix by performing matrix multiplication on said first set of elements from a first and second matrices, said first set of elements corresponding to said first set of elements of said at least two matrices;
     normalizing said first set of elements of said product matrix and determining a shift factor for said first set of elements; and,
     calculating a second set of elements of said product matrix, said second set of elements corresponding to said second set of elements of said at least two matrices and determining a plurality of translation shift factors for said second set of elements; and,
   transforming a plurality of points of said graphics object by multiplying the coordinates of each of said plurality of points by said product matrix.

2. The method according to claim 1 wherein said second set of elements comprise translation elements.

3. The method according to claim 1 wherein said first set of elements comprise rotation elements.

4. The method according to claim 1 wherein said first set of elements comprise scaling elements.

5. The method according to claim 1 wherein said first set of elements comprise shearing elements.

6. The method according to claim 1 wherein said normalizing step further comprises the steps of:
   determining a minimum number of leading zeros in any element of said product matrix;
   shifting each element in said product matrix by said minimum number of leading zeros; and
   decrementing said shift factor for said product matrix by said number of leading zeros.

7. The method of claim 1, further comprising the step of adjusting clipping boundaries of said graphics processing system based on values of said shift factor and said translation shift of said product matrix.

8. The method of claim 1, wherein said each of said matrices has three columns and four rows, and wherein said first set of elements comprises three rows of three columns and said second set of elements comprises the fourth row of three columns.

9. The method of claim 1, wherein four transformation matrices are defined and wherein said product matrix is the concatenation of the first and second matrices, further comprising the steps of:
   forming a second product matrix by concatenating the third and fourth of said matrices; forming an overall transform matrix representing the concatenation of all four matrices by concatenating said first and second product matrices;
   establishing a first indicator to indicate whether said first or second matrix was modified since the last forming of said first product matrix;
   establishing a second indicator to indicate whether said third or fourth or first product matrix was modified since the last forming of said overall transform matrix;
   forming said first product matrix only when said first indicator indicates a change; and
   forming said overall transform matrix only when said second indicator indicates a change.

10. A method of transforming a graphics object for display on a graphics display device comprising the steps of:
    forming at least two matrices for transformation each matrix containing a first set of elements and second set of elements;
    defining a register to contain a shift factor for said first set of elements;
    defining a plurality of registers each of which contains a translation shift factor for one of said second set of elements;
    forming a product matrix by concatenating two of said at least two matrices, said concatenation comprising the steps of:
      calculating a first set of elements for said product matrix, said first set of elements corresponding to said first set of elements of said at least two matrices;
      normalizing said first set of elements of said product matrix and determining a shift factor for said first set of elements; and,
      calculating a second set of elements of said product matrix, said second set of elements corresponding to said second set of elements of said at least two matrices and determining a plurality of translation shift factors for said second set of elements;
    transforming a plurality of points of said graphics object by multiplying the coordinates of each of said plurality of points by said product matrix; and
    displaying said transformed points on said graphics display device.

11. The method according to claim 10 wherein said second set of elements comprise translation elements.

12. The method according to claim 10 wherein said first set of elements comprise rotation elements.

13. The method according to claim 10 wherein said first set of elements comprise scaling elements.

14. The method according to claim 10 wherein said first set of elements comprise shearing elements.

15. The method according to claim 10 wherein said normalizing step further comprises the steps of:
    determining a minimum number of leading zeros in any element of said product matrix;
    shifting each element in said product matrix by said minimum number of leading zeros; and
    decrementing said shift factor for said product matrix by said minimum number of leading zeros.

16. The method of claim 10, further comprising the step of adjusting clipping boundaries of said graphics processing system based on values of said shift factor and said translation shift factors of said product matrix.

17. The method of claim 10, wherein said display device is a raster graphics display terminal.

18. The method of claim 10, wherein said display device is a laser printer.

* * * * *